United States Patent
Delatorre et al.

[11] 3,786,675
[45] Jan. 22, 1974

[54] PORTABLE GAS LEAK DETECTOR

[75] Inventors: Leroy C. Delatorre, Spring; William J. Rapson, Houston, both of Tex.

[73] Assignee: Uson Corporation, Houston, Tex.

[22] Filed: Nov. 23, 1970

[21] Appl. No.: 92,035

[52] U.S. Cl.............. 73/27 R, 340/237 R, 340/242
[51] Int. Cl. ........................................... G01n 31/00
[58] Field of Search... 73/27, 26, 23, 23.1; 340/240, 340/233, 285, 237 R, 242; 324/61 B, 61 R; 23/254 E, 255 E

[56] References Cited
UNITED STATES PATENTS

| | | | |
|---|---|---|---|
| 3,714,421 | 1/1973 | Josias et al...................... | 73/23.1 X |
| 3,187,558 | 6/1965 | Koncen et al..................... | 73/27 R |
| 3,494,196 | 2/1970 | Moussette....................... | 340/233 X |
| 3,452,656 | 7/1969 | Ruble et al. .................... | 340/233 X |
| 3,247,703 | 4/1966 | Burk ................................. | 73/23.1 |
| 3,429,178 | 2/1969 | Durbin.............................. | 73/27 R |

Primary Examiner—Richard C. Queisser
Assistant Examiner—Stephen A. Kreitman
Attorney, Agent, or Firm—Jefferson D. Giller; James F. Weiler; William A. Stout

[57] ABSTRACT

In a portable gas leak detector for determining the location of leaks of gases having a different thermal conductivity than the ambient surroundings and having a conductivity detector, first amplifier and output, the improvement of a positive and a negative drive amplifier connected to the first amplifier with separate indicating lights connected to each of the positive and negative drive amplifiers for indicating the relative conductivity of the sample to the ambient surroundings and whether the detector is approaching or leaving a leak. A feedback loop connected across the first amplifier which includes an amplifier having a memory retaining means for zeroing the output for overcoming temperature induced drift in the detector and nulling the output of the detector thereby allowing accurate pin-pointing of the leak. Means for actuating the feedback loop including a manual switch, an automatic switch when the output is less than a predetermined amount, and an automatic switching means when the output is more than a predetermined amount for a certain period of time.

8 Claims, 3 Drawing Figures

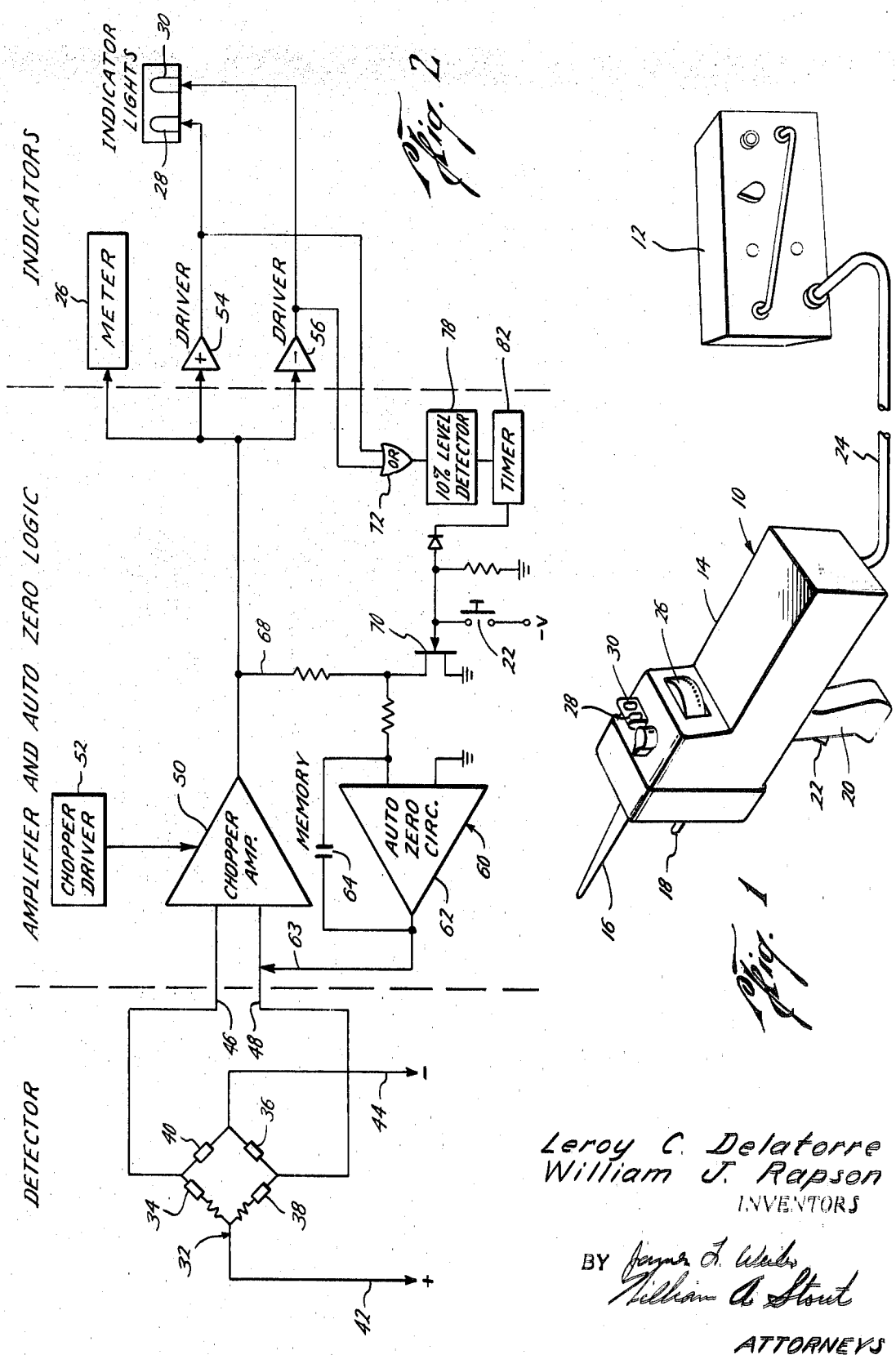

Leroy C. Delatorre
William J. Rapson
INVENTORS

PORTABLE GAS LEAK DETECTOR

BACKGROUND OF THE INVENTION

Prior art such as U.S. Pat. No. 3,187,558 discloses a gas leak detector using a thermal conductivity bridge. The present invention is directed to improvements in such a leak detector which includes indicating circuits which will readily show the operator the amount of concentration encountered, its relative conductivity, and whether the instrument is approaching or leaving a leak thereby quickly enabling the operator to pinpoint the leak. Other improvements of the present invention include an automatic zeroing circuit which zeros the output to the indicators independent of time and temperature induced drift in the detectors. Said automatic zeroing circuit can be actuated manually or automatically, and also functions to null the output of the detector to cancel out background gas sensed by the detector by holding the previous measured level in a memory.

SUMMARY

The present invention is generally directed to various improvements in a portable leak detector for determining the location of leaks of gases having a different thermal conductivity than the ambient surroundings.

A further object of the present invention is the improvement in a portable leak detector having a conductivity detector, first amplifier and an output meter in which a positive and a negative drive amplifier are each connected to the first amplifier and a separate indicating light is connected to each of the positive and negative drive amplifiers to indicate the polarity of the conductivity of the sample gas and also whether the leak detector is approaching or leaving a leak.

A still further object of the present invention is the provision of a leak detector having a feedback loop connected across the amplifier of the detector which includes a memory retaining means and means for actuating the feedback loop.

Yet a further object of the present invention is the provision of an auto zero circuit feedback which is used to maintain a zero output from the detector independent of time and temperature induced drift in the detector and which also is used to cancel out background gas measurements which can interfere with the operation and prevent accurate pinpointing of the leak. The auto zeroing circuit may be actuated by a manual trigger for nulling the output of the detector to hold the previous measurement level in a capacitor memory thereby canceling out background gas measurements sensed by the detector, may include an automatic switching means for actuating the feedback loop or automatic zeroing circuit when the output is les than a predetermined amount thereby reducing the temperature drift in the detector from giving a readout signal, and may further include an automatic switching means for actuating the feedback loop when the output is more than a predetermined amount for a predetermined period of time.

BRIEF DESCRIPTION OF THE DRAWINGS

FIG. 1 is a perspective view of the portable leak detector of the present invention, FIG. 2 is a schematic block diagram of the present invention.

DESCRIPTION OF THE PREFERRED EMBODIMENT

Figure 3:
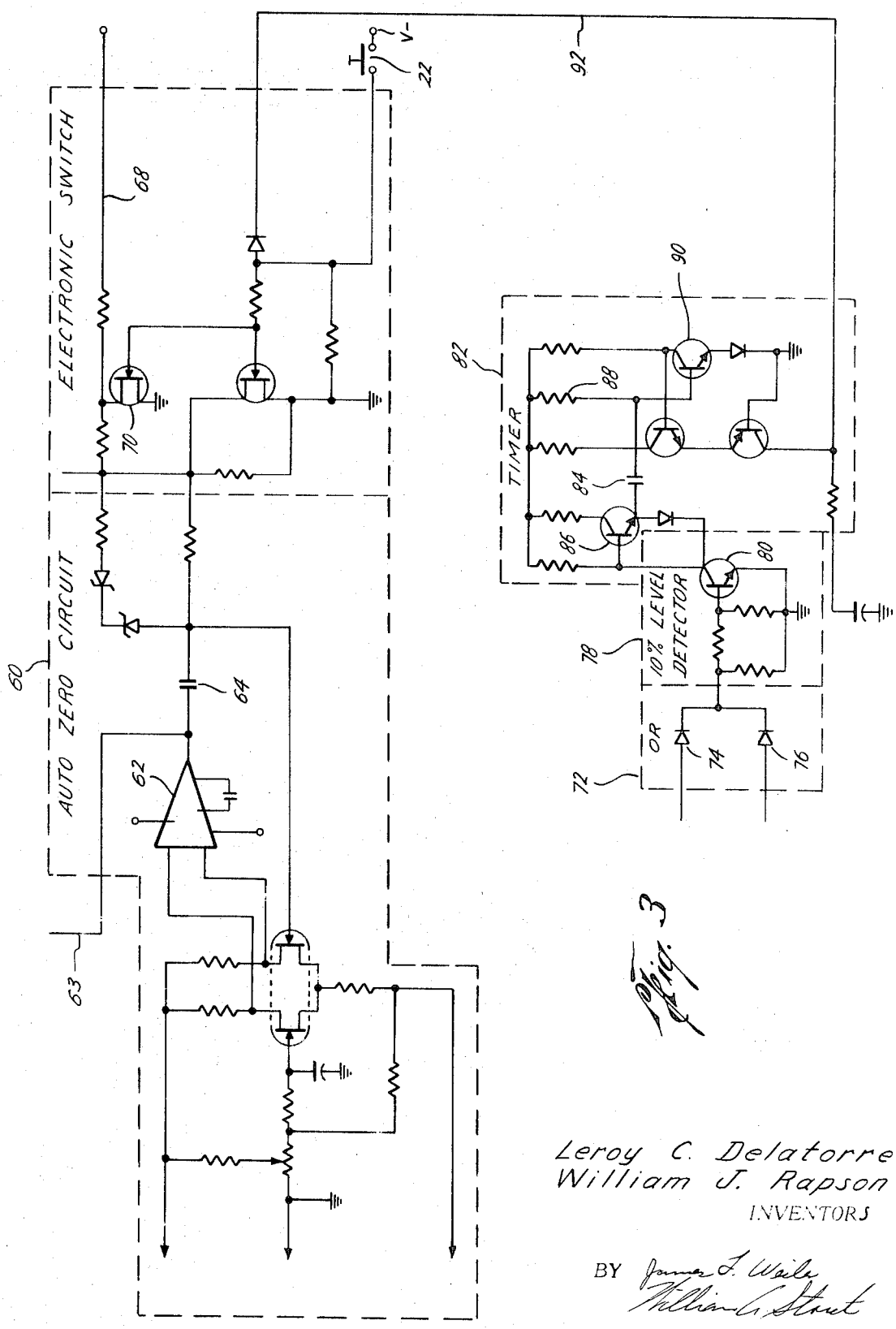
FIG. 3 is a schematic drawing of the auto zeroing logic circuit and its actuation.

Referring now to FIG. 1 the reference numeral 10 generally indicates the portable leak detector of the present invention and generally includes a power supply 12 and a portable instrument 14 which is used for probing for gas leaks. The portable instrument 14 includes a probe 16 through which the sample gas is drawn and an inlet 18 through which ambient gas from the surrounding is drawn and has a pistol grip for ease of carrying and a trigger 22 whose function will be more fully described hereinafter. The portable instrument 14 is connected only by a cable 24 to the power supply 12 for portability. The instrument 14 includes a readout meter 26, and indicator lights 28 and 30, all of whose function and operation will be more fully described hereinafter.

Referring now to FIG. 2, the apparatus 10 may include a detector generally indicated by the reference numeral 32 such as a thermal conductivity Wheatstone bridge, as more fully described in U.S. Pat. No. 3,187,558, having reference detectors 34 and 36 and sampling detectors 38 and 40 connected in a Wheatstone bridge to a power source from lines 42 and 44. Detectors 38 and 40 are exposed to the sample gas which is drawn through the sample probe 16 (FIG. 1) while the reference detectors 34 and 36 are exposed to the ambient surrounding gas which is drawn in through air intake 18 (FIG. 1) all by a pump (not shown). Different types of gases have different thermal conductivity and thus if the sample gas is different from that of the ambient atmosphere, the cooling effects on the opposite sides of the bridge will be different and the bridge balance will be changed and produce an output signal across the detector output 46 and 48, which is coupled to a chopper amplifier 50 which is driven by a chopper driver 52. The output from the chopper amplifier 50 is phase sensitive to the input polarity and the output of the chopper amplifier is connected to a positive driver amplifier 54 and a negative driver amplifier 56. Each driver is connected to and operates its own variable intensity indicating light such as driver 54 actuating the indicating light 28 which may be red and driver 56 connected to and actuating indicating light 30 which may be yellow to distinguish it from the first light. Thus, the indicating lights 28 and 30 are keyed to the positive or negative output of the detector bridge 32. An indicating meter 26 is directly connected to the output of the chopper amplifier 50 and is not polarity sensitive. Thus, the phase sensitive indicator lights 28 and 30 are directly related to the polarity output of the detector. For a gas with thermal conductivity higher than air (or other reference gas), light 28 is driven by driver 54 and actuated. For a sample gas with a lower thermal conductivity than air or the ambient surroundings or other reference gas, the second light 30 is driven by driver 56 and actuated. And, of course, both the meter 26 and the lights 28 and 30 are driven proportional to the gas concentration. Thus, the output from the chopper amplifier 50 is indicative of the rate of a gas leak and the provision of the two indicating lights 28 and 30 allows the indication of the thermal conductivity of the sample gas with reference to the ambient surroundings, and additional advantages which will be mentioned hereinafter.

However, in prior gas leak detectors, problems of sensitivity and temperature drift have been encountered. The present invention includes an automatic zeroing circuit generally indicated by the reference numeral 60 which generally includes a feedback loop 63 connected across the chopper amplifier 50 and includes an amplifier 62 having memory retaining means such as a capacitor 64. The auto zeroing circuit 60 is used to automatically maintain a zero output to the indicators including the meter 26 and indicator lights 28 and 30 independent of time and the temperature induced drift in the detector bridge 32. The auto zeroing circuit 60 also is used to cancel out the measurement of background gas in the ambient surroundings which can interfere with the operation and prevent accurate pinpointing of the leak being sought. Thus, the auto zeroing circuit 60 functions to null the output from the detector bridge 32 and hold the previous measurement level in the capacitor memory 64.

Preferably, the present invention utilizes three means for actuating the automatic zeroing circuit 60. First, if the indication of the meter 26 is at a low level, for example, less than ten percent of full scale, the reading will not be particularly meaningful as the reading could be caused by temperature drift at such lower levels. Therefore, means are provided for actuating the zeroing circuit 60 when the output is below a predetermined level. Secondly, if the output on the meter indication remains above a predetermined amount, such as above ten percent of full scale, a timer is provided which will actuate the automatic zeroing circuit after a predetermined time, for instance twelve seconds, to zero the output. Thus, these two methods insure that effective temperature drift has been reduced to that which occurs at longest during a 12 second interval, and thus essentially eliminates long term temperature drift effects from adversely affecting the detector.

The third means for actuating said feedback loop or auto zeroing circuit 60 is the manual trigger switch 22 which is useful in pinpointing the leak. That is, the memory is normally at a zero level in air. When a gas is detected only one of the indicator lights 28 or 30 is driven. By mementarily depressing the trigger switch 22 when a given gas concentration indication is given that measurement is stored in the memory 64. When the detector is removed to air from the gas indication, then the detecting indicator light becomes extinguished and the second indicator light is driven because the now stored memory 64 and auto zero circuit 60 have a negative imbalance compared to the detectors. This type of operation allows one of the indicating lights 28 or 30 to indicate as a higher gas concentration is encountered (as the leak is approached) and and the other light to indicate as a lower gas concentration (as the leak is passed and left) is encountered. Thus, by use of the manual trigger 22 actuating the auto zeroing circuit the two indicator lights can be used to effectively determine the proper direction to move the instrument 14 and find the highest gas concentration and pinpoint the leak source. The auto zeroing circuit 60 may be also used continuously by holding the trigger switch 22 continuously and keep the auto zeroing circuit 60 and memory balancing 64 operating continuously which may be desirable in cases of high gas concentrations since under such conditions the output from the chopper amplifier would then be measuring rate of change and thereby prevents the meter 26 from going off scale as well as maintaining high sensitivity in the presence of accumulated gas. This latter feature is an advantage over the usual type of instrument having various scales which when switched to the higher scale lower the sensitivity of the instrument. In the present apparatus 10 the auto zeroing circuit 60 merely cancels out background gas sensed by the detectors by depressing the trigger switch 22 and zeroing the indication out without any loss in sensitivity.

Referring now to FIGS. 2 and 3, and assuming that the output from the chopper amplifier 50 is less than a predetermined amount, for example ten percent of the full scale of the meter 26, the voltage applied to line 92 is such that the electronic switch 70 is opened and therefore the auto zeroing circuit 60 is continually actuated for zeroing the output and eliminating temperature drift which may be a significant portion of the output signal at such low levels. However, when the output from the chopper amplifier 50 applied to line 68 increases over the predetermined amount, for example 10 percent of full scale of the meter 26, the electronic switch 70 is closed to ground and The automatic zeroing circuit 60 is deactivated.

As previously indicated, the auto zeroing circuit 60 is also actuated if the output from the chopper amplifier 50 is over the predetermined amount, for example ten percent of the scale 26, for a predetermined period of time, for example twelve seconds. This is accomplished through the OR circuit 72 which is used to couple a positive output from either driver 54 or 56 to a level detector 78, and which may consist of diodes 74 and 76 connected to the output of the drivers 54 and 56, respectively, to provide a signal output to the 10 percent level detector 78 which includes transistor 80 which is actuated when the 10 percent level output is reached to provide a signal to the timer 82. The 12 second timer 82 operates by charging condenser 84 through the transistor 86 and then discharging condenser 84 through a resistor 88 to provide the desired time delay. If the output signal remains above the 10 percent level for the twelve second time delay, transistor 90 is actuated to provide a signal through line 92 to open the electronic switch 70 thereby again actuating the auto zeroing circuit 60. The 12 second time period is used to cancel out the temperature induced drift from the detectors as well as canceling out background gas signals which might prevent accurate pinpointing of any leak. The 12 second timer 82 momentarily closes the electronic switch 70 every 12 seconds if the output level is over ten percent to automatically insure accurate pinpointing of the leak.

And the third means for actuating the auto zeroing circuit 60 is the trigger switch 22 which may be used intermittently to open the electronic switch 70 to null the output of the chopper amplifier 50.

In use, the portable instrument 14 is used to scan the area of the suspected leak and the sample is drawn into the probe 16 wherein the conductivity of the sample gas is compared with the ambient surrounding gas drawn in through inlet 18 to provide an output from the Wheatstone bridge detector to the chopper amplifier and through the meter 26 and indicator lights 28 and 30. So long as the auto zeroing circuit 68 is unactuated, the meter 26 gives a quantitative reading and the scale is linear for accurate leak rate measurement. The indicator lights 28 and 30 are phase sensitive and for a sample gas having a higher conductivity than the ambient surrounding the light 28 will be driven and for a sample gas with a lower thermal conductivity than the surrounding ambient gases light 30 will be actuated. The intensity of the lights 28 and 30 is an indication of the concentration encountered. The colors of the lights 28 and 30 are preferably interchangeable and in practice normally the yellow light is used for an indication of the gas of interest. When the leaking gas is first detected, the meter 28 and indicating light indicates this proportional to the gas concentration on a continuous basis and if the instrument 14 is removed from the gas concentration the indicators will return to zero.

In order to reduce the effect of temperature drift in the detector 32, the auto zeroing circuit 60 is automatically and continually actuated at lower levels, such as less than ten percent of full meter scale by means of the quiesent timer signal to line 92 thereby automatically maintaining a zero output from the chopper amplifier. And in the event that the output is over a predetermined amount, such as ten percent of the scale of meter 26, the level is detected by level detectors 78 and the timer 82 to actuate the electronic switch 70 for twelve seconds to hold the value stored in memory 64 after which the electronic switch is deactuated by the timer to zero the output to reduce temperature drift effects and to cancel out the effects of background gas which can interfere with accurate pinpointing of the leak.

Of course, the operator need not wait for 12 seconds to cancel out the effects of background gas, but can actuate the trigger switch 22 at any time. The memory 64 of the auto zeroing circuit 60 is normally at zero level in air. When a gas is detected, one of the indicator lights 28 or 30 is driven and if the trigger switch 22 is momentarily depressed when a gas concentration indication is given that indication level is stored in the memory 64. If the instrument 14 is moved away from the gas concentration, the second indicator light is driven because the memory 64 and the auto zeroing circuit 60 has a negative imbalance with the detector circuit 32. However, if desired, the detector and indicators may be zeroed again by depressing the trigger switch when the instrument 12 is withdrawn from the concentration.

By use of the trigger switch 22 the operator has the option of automatically zeroing the circuit to cancel out background gas sent by the detectors 22 as desired. Ordinarily, a gas concentration which would cause an indication over full scale of the meter 26 would necessitate a sensitivity range change to keep the indication on the meter scale 26. However, with the automatic zeroing circuit 60, the trigger switch 22 can be depressed and the indication zeroed out. The gas concentration measurement indication is then stored in the automatic zero memory 64. Also, the trigger switch 22 may be held continuously, if desired, to keep the auto zero circuit and memory balancing continuously which may be desirable when the instrument 12 is positioned close to the leak since the rate of concentration is greater and in that event the scale 26 would be an indication of the rate of change. Or the trigger switch 22 may be depressed only momentarily as required to zero the output indicator. In either event zeroing circuit 60 allows the leak detector 10 to maintain high sensitivity in the presence of accumulated gas.

The automatic zeroing circuit 60 also provides ease in pinpointing leak sources. By depressing the trigger switch, normally on a continuous basis, when an indication of gas concentration is obtained, the automatic zeroing circuit is actuated. This allows one light to indicate as a higher gas concentration is approached and allows the other gas to indicate a lower gas concentration as the leak is passed. Thus, with the automatic zeroing circuit 60 actuated, the two indicator lights effectively determine the proper direction to move the instrument 14 to find the highest gas concentration and pinpoint the leak source.

The present invention, therefore, is well adapted to carry out the objects and attain the ends and advantages mentioned as well as others inherent therein.

What is claimed is:

1. In a leak detector for determining the location of leaks of gases having a different thermal conductivity than the ambient surroundings by moving the detector in the vicinity of a leak and detecting the increase or decrease of leaking gas and having a gas detector, and a first amplifier connected to the gas detector and having an output, the improvement comprising, a positive polarity indicating means connected to the output of the first amplifier, a negative polarity indicating means connected to the output of the first amplifier, a feedback loop connected across the first amplifier including an amplifier having memory-retaining means whereby said loop when actuated holds the measurement level of the first amplifier in the memory-retaining means thereby nulling the output from the first amplifier and nulling both of the polarity indicating means, and means for actuating said feedback loop including automatic switching means for actuating the feedback loop when the output is less than a predetermined amount.

2. In a leak detector for determining the location of leaks of gases having a different thermal conductivity than the ambient surroundings by moving the detector in the vicinity of a leak and detecting the increase or decrease of leaking gas and having a gas detector, and a first amplifier connected to the gas detector and having an output, the improvement comprising, a positive polarity indicating means connected to the output of the first amplifier, a negative polarity indicating means connected to the output of the first amplifier, a feedback loop connected across the first amplifier including an amplifier having memory-retaining means whereby said loop when actuated holds the measurement level of the first amplifier in the memory-retaining means thereby nulling the output from the first amplifier and nulling both of the polarity indicating means, and means for actuating said feedback loop including automatic switching means for actuating the feedback loop when the output is more than a predetermined amount for a predetermined period of time.

3. In a leak detector for determining the location of leaks of gases having a different thermal conductivity than the ambient surroundings by moving the detector in the vicinity of a leak and detecting the increase or decrease of leaking gas and having a gas detector, and a first amplifier connected to the gas detector and having an output, the improvement comprising, a positive polarity indicating means connected to the output of the first amplifier, a negative polarity indicating means connected to the output of the first amplifier, a feedback loop connected across the first amplifier including an amplifier having memory-retaining means whereby said loop when actuated holds the measurement level of the first amplifier in the memory-retaining means thereby nulling the output from the first amplifier and nulling both of the polarity indicating means, and means for actuating said feedback loop including a manual switch and including automatic switching means for actuating the feedback loop when the output is more than a predetermined amount for a predetermined period of time.

4. The apparatus of claim 3 wherein the means for actuating said feedback loop includes automatic switching means for actuating the feedback loop when the output is less than a predetermined amount.

5. In a leak detector for determining the location of leaks of gases having a different thermal conductivity than the ambient surroundings by moving the detector in the vicinity of a leak and detecting the increase or decrease of leaking gas and having a gas detector, first amplifier and output, the improvement comprising, a positive drive amplifier and a negative drive amplifier each connected to the first amplifier, a separate indicating light connected to each of the positive and negative drive amplifiers, a feedback loop connected across the first amplifier including a second amplifier having a memory retaining means connected across the second amplifier whereby said loop when actuated holds the measurement level of the first amplifier in the memory-retaining means and nulls the output from the first amplifier, and nulls both of the indicating lights, a manual switch for actuating said feedback loop thereby nulling the current gas measurement indicated by the indicating lights whereby further movement of the detector in the vicinity of the leak will actuate one or the other indicating light showing whether the detector is approaching or leaving the leak thereby allowing the detector to pin-point the leak by actuating the manual switch during movement of the detector.

6. The apparatus of claim 5 wherein the means for actuating said feedback loop includes automatic switching means for actuating the feedback loop when the output of said amplifier is less than a predetermined amount.

7. The apparatus of claim 6 wherein the means for actuating said feedback loop includes automatic switching means for actuating the feedback loop when the output of the first amplifier is more than a predetermined amount for a predetermined period of time.

8. A leak detector for determining the location of leaks of gases having a different thermal conductivity than the ambient surroundings by moving the detector in the vicinity of a leak and detecting the increase or decrease of leaking gas thereby locating the leak comprising, a gas detector, a first amplifier connected to the output of the gas detector, a positive polarity indicating means connected to the output of the first amplifier, a negative polarity indicating means connected to the output of the first amplifier, a feedback loop connected between the output and the input of the first amplifier said feedback loop including a second amplifier and a memory retaining means connected across the second amplifier whereby said loop when actuated holds the measurement level of the first amplifier in the memory retaining means thereby nulling the output from the first amplifier and nulling both of the polarity indicating means, and a manual switch for actuating said feedback loop as the detector is moved in the vicinity of a leak for nulling the gas measurement indicated by the polarity indicating means whereby on further movement of the detector any actuation of the positive polarity indicating means or negative polarity indicating means will indicate whether the detector is approaching or leaving a leak thereby allowing the detector to pinpoint the leak.

* * * * *